Feb. 9, 1960 M. PRICE 2,924,100
TIRE GAUGES
Filed Jan. 7, 1957
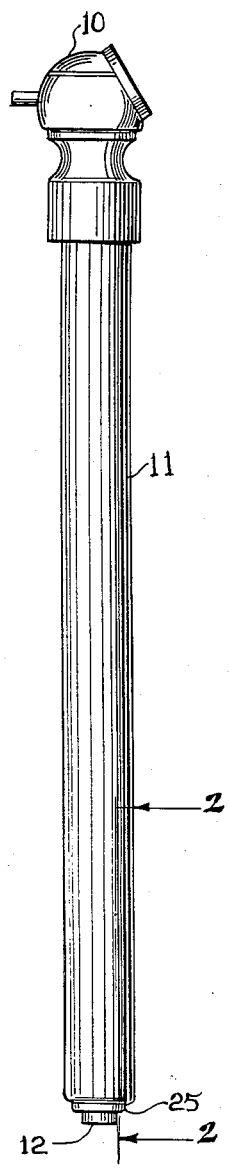
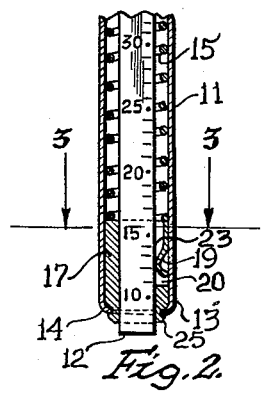
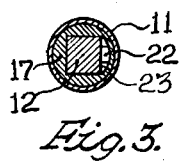
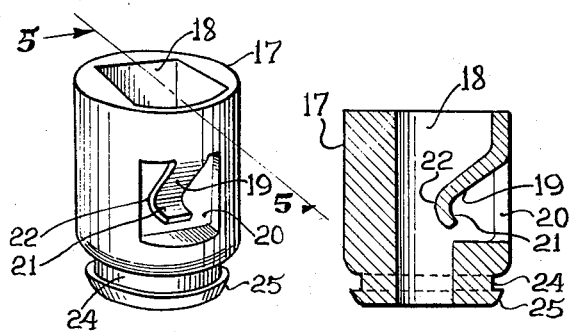
INVENTOR.
MILTON PRICE
BY Shreedy & Shreedy
HIS ATTORNEYS.

United States Patent Office 2,924,100
Patented Feb. 9, 1960

2,924,100

TIRE GAUGES

Milton Price, Chicago, Ill., assignor to Milton Manufacturing Co., Inc., Chicago, Ill., a corporation of Illinois Application January 7, 1957, Serial No. 632,783

1 Claim. (Cl. 73—396)

This invention relates to new and useful improvements in tire gauges and more particularly has reference to an arrangement for holding the gauge stick in a projected position whereby a pressure reading may be accurately and conveniently obtained.

In tire or air gauges of the type with which my invention is concerned there is generally employed an elongated gauge stick or bar having graduations and numerals thereon for conveniently reading. The gauge stick in the conventional tire or air gauge is projected outwardly from within its tubular housing under pneumatic pressure. For accurate reading of the air pressure within a tire, it is essential that the gauge stick be held in a projected position during the reading operation, by a means which will not interfere with the movement of the gauge stick under pneumatic force. It is therefore an object of this invention to provide a simple and inexpensive arrangement for accomplishing the fore-going objects.

Yet another and equally important object of the invention is to provide a gauge stick guiding and retaining sleeve of a single molded body having an integral gauge stick engaging member for holding or retaining the gauge stick in its projected position during the reading operation thereof and which sleeve will be simple in construction and economical to manufacture.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is an elevational view of a tire or air gauge with which my invention is associated;

Fig. 2 is an enlarged fragmentary vertical sectional detailed view of the same taken on line 2—2 of Fig. 1;

Fig. 3 is a sectional detailed view taken substantially on line 3—3 of Fig. 2;

Fig. 4 is a perspective view of the retainer sleeve embodied in the invention;

Fig. 5 is a sectional detailed view taken substantially on line 5—5 of Fig. 4.

The several objects of the invention are accomplished by the preferred form of construction shown in the accompanying drawings. In such drawings, I have illustrated a conventional tire or air gauge which includes a head 10 adapted for operative engagement with a tire valve or the like. This head is carried by a tubular member 11 within which is arranged a gauge bar 12 preferably of elongated formation and substantially square or rectangular in cross section.

The lower open end portion 13 of the tubular member 11 provides an inwardly turned retaining flange 14. Surrounding the gauge bar 12 and arranged within the tube 11, is a compression spring 15.

The gauge bar 12, which may be formed of any suitable material slides longitudinally within and beyond the open end of the tube under pneumatic pressure resulting when the head 10 operatively engages with a tire valve (not shown) or the like.

Arranged within the tube 11 is my improved guide and bearing sleeve 17. Such sleeve 17 is cylindrical in cross section and has a longitudinal extending opening 18 formed therethrough, through which the gauge bar 12 moves. Such opening 18 as shown in the drawing is substantially square or rectangular in plan view.

The sleeve 17 in one side wall thereof is provided with an opening 20. Formed integral with the sleeve within the area of the opening and extending in a longitudinal direction with respect to the sleeve is an elongated flexible tongue or finger 19. The finger 19 is molded integrally with the sleeve 17. The free end portion 21 of the finger 19 is curved inwardly and outwardly thus to provide a rounded heel 22 yieldably engageable with the adjacent flat side 23 of the gauge bar 12.

When the heel 22 of the finger 19 is engaged by the gauge bar 12 such finger yieldably bears upon the gauge bar 12 to resist movement of such gauge bar during the reading operation thereof.

In the molding of the sleeve 17 the curved heel portion 22 of the finger 19 will facilitate removal of the sleeve from the mold without rupturing or damaging the finger. This is by reason of the fact that the heel portion 22 will cause finger 19 to ride over the core of the mold during the withdrawal of the core from the sleeve.

Also molded in the sleeve, at its lower end portion is an annular groove 24. The end of the portion of the tube 11 opposite the head 10 provides the inwardly turned retaining flange 14. The sleeve is positioned into the tube from the end to which the head 10 is attached. By forcing the sleeve 17 past the retaining flange 14, the latter will be sprung into the groove 24 thereby to provide a permanent connection between the sleeve 17 and the tube 11. To facilitate the insertion of the sleeve to a position where the retaining flange 14 will engage into the annular groove 24, the end of the sleeve 17 is chamfered as at 25.

My improved guide and bearing sleeve may be formed of any suitable material which will best serve the purpose. However, for best results the sleeve and its integral finger are formed of nylon or the like.

From the foregoing description, it will be apparent that the sleeve 17 and the finger 19 are formed integrally together during a single molding operation resulting in a substantial saving in the manufacturing costs and mass production.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention what I claim as new and desire to protect by Letters Patent is:

A pressure gauge having a cylindrical hollow sleeve having an open end through which is adapted to move a gauge bar, said sleeve adjacent said open end providing an inwardly extending retainer flange, a molded closure body adapted to be inserted in the open end of said sleeve, said body having its substantial full length equal in diameter to the inside diameter of said sleeve so as to frictionally fit therein, one end of said body having its circumference reduced and projected out of the open end of said sleeve, said one end of said body having formed therein an exposed circumferentially extending retainer groove for frictionally receiving said retainer flange of said sleeve so as to fixedly mount said body in said open end of said sleeve, said body having an elongated opening extending longitudinally therethrough, with an opening formed in one side wall of said body extending transversely to the elongated opening and having open communication therewith, and a flexible friction finger integral with the body within the transversely extending open and extending in a longitudinal direction with respect to the sleeve and having the free end thereof substantially grooved to form a heel portion, said heel portion adapted to project into the longitudinally extending opening of said body in the direction of said retainer flange and into yieldable engagement with the gauge bar for resiliently positioning said bar with respect to said body.

References Cited in the file of this patent

UNITED STATES PATENTS

| | | |
|---|---|---|
| 1,465,725 | Bowden | Aug. 21, 1923 |
| 1,900,414 | Ellberg et al. | Mar. 7, 1933 |
| 1,998,420 | Carliss | Apr. 16, 1935 |
| 2,049,532 | Williams | Aug. 4, 1936 |
| 2,096,328 | Iskyan | Oct. 19, 1937 |
| 2,686,445 | Keck | Aug. 17, 1954 |